Patented Apr. 29, 1941

2,240,383

UNITED STATES PATENT OFFICE 2,240,383

AMINOSULPHONAMIDO DIPHENYL SULPHONES

James H. Williams, Riverside, Conn., assignor to American Cyanamid Company, New York, N. Y., a corporation of Maine No Drawing. Application June 27, 1939, Serial No. 281,328

2 Claims. (Cl. 260—397.6)

This invention relates to p-amino-p'-sulphonamidodiphenyl sulphones, their salts, and their method of preparation.

The compounds of the present invention have the following general formula:

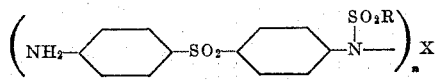

in which R is an alkyl or aryl radical, X is hydrogen, a metal or an ammonium radical and $n$ is a small whole number.

The p-amino-p'-sulphonamidodiphenyl sulphones of the present invention may be prepared in good yield by the reaction of p-acylamino-p'-aminodiphenyl sulphones with alkyl, aryl or heterocyclic sulphonyl chlorides, followed by deacylation.

These compounds are the sulphur analogues of monoacylated diaminodiphenyl sulphones which have high therapeutic activity against various bacterial infections such as those due to pneumococci, streptococci, and the like. These are described and claimed in the copending application of Williams and Roblin, Serial No. 233,244 filed October 4, 1938. It is an advantage of the present invention that the $RSO_2$-group replacing the RCO-group in the compounds of the above-mentioned application has rendered the resulting p-amino-p'-sulphonamidodiphenyl sulphones much less toxic than the monoacylated diaminodiphenyl sulphones.

The sodium salts of the compounds of this invention may be prepared by dissolving the amide in a suitable amount of warm concentrated sodium hydroxide solution and cooling to obtain the desired sodium derivative. Other metallic salts may best be prepared by double decomposition reactions between the sodium salts and suitable salts of the desired metal in water solution. Thus, with $CuSO_4$, $FeCl_3$, $HgCl_2$ and the like, the corresponding salts may be prepared.

The ammonium salts may be prepared in a manner analogous to the method of preparation of the sodium salts, the ammoniacal solution being evaporated down to remove excess ammonia and to obtain the salt.

The invention will be described in greater detail in conjunction with the following specific examples which are merely illustrative and not intended to limit the scope of the invention.

EXAMPLE 1

*p-Amino-p'-octylsulphonamidodiphenyl sulphone*

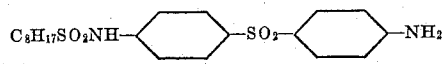

10 g. of p-acetylamino-p'-aminodiphenyl sulphone were added to 45 cc. of dry pyridine. To the resulting mixture 13 g. of freshly distilled N-octylsulphonyl chloride were added slowly with stirring. The rate of addition was such that the temperature did not rise above 30° C. When the reactants were all together they were stirred at room temperature for a half hour followed by heating at 80°–90° C. for a half hour and then refluxed for an hour. At the end of this time the pyridine was distilled off with concurrent slow addition of water to the reaction vessel until a precipitate formed. The reaction mixture was then diluted with one liter of water and filtered.

The precipitate which was recovered was added to 100 cc. of 20% potassium hydroxide and refluxed for an hour. At the end of the hour, an oil had separated. The supernatant liquid was decanted and the oil treated with 50% sodium hydroxide until the oil went into solution.

The alkaline solution was treated with decolorizing carbon, filtered, and the filtrate acidified with acetic acid. The precipitate which formed was crystallized from methyl alcohol. The melting point of the product was 130° C.

EXAMPLE 2

*p-Amino-p'-sulphanilamidodiphenyl sulphone*

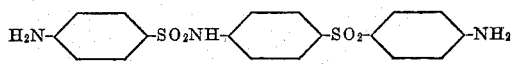

16 g. of p-acetylamino-p'-aminodiphenyl sulphone were added to 40 cc. of dry pyridine. To the resulting mixture 17 g. of dry p-acetylaminobenzenesulphonyl chloride were added slowly with stirring. The temperature throughout the addition was maintained below 60° C. When the acid chloride had all been added the reaction mixture was stirred for a half hour and then refluxed for a half hour. At the end of this time, 32 g. of sodium hydroxide dissolved in 125 cc. of water were slowly added, with simultaneous distillation of a pyridine-water mixture from the reaction vessel. Distillation was continued after all the sodium hydroxide had been added and water was slowly added to maintain approximately the starting volume. As the pyridine was removed a solid began to precipitate. At the end of about one hour the reaction mixture was cooled and filtered. The precipitate was dissolved in 20% sodium hydroxide solution and boiled for one hour with decolorizing carbon. On cooling, filtering and neutralizing the filtrate with hydrochloric acid, a precipitate was obtained. The precipitate was dissolved in dilute hydrochloric acid, filtered to remove a little red-colored material which did not dissolve, and the filtrate was neutralized with sodium acetate. The product thus obtained was crystallized from an ethanol-water mixture. The melting point was 211° C. with preliminary softening.

In the above example, the p-acylamino-p'-aminodiphenyl sulphone used as a reactant was the acetyl derivative. This derivative is used because it is relatively inexpensive and easily available but it should be understood that the invention is in no sense limited to this specific modification and the propionyl, butyryl, benzoyl or similar derivatives can be used just as effectively.

What I claim is:

1. p - Amino - p' - sulphonamidodiphenyl sulphones having the following general formula:

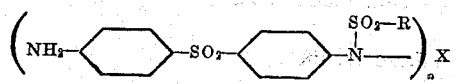

in which R is an alkyl radical, X is a member of the group consisting of hydrogen, metals and ammonium radicals and $n$ is the valence of X.

2. p-Amino-p'-octylsulphonamidodiphenyl sulphone having the following formula:

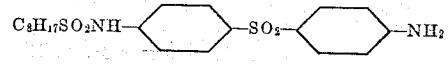

JAMES H. WILLIAMS.